(No Model.) 2 Sheets—Sheet 2.
T. S. HARRISON.
Drying Apparatus.
No. 241,653. Patented May 17, 1881.
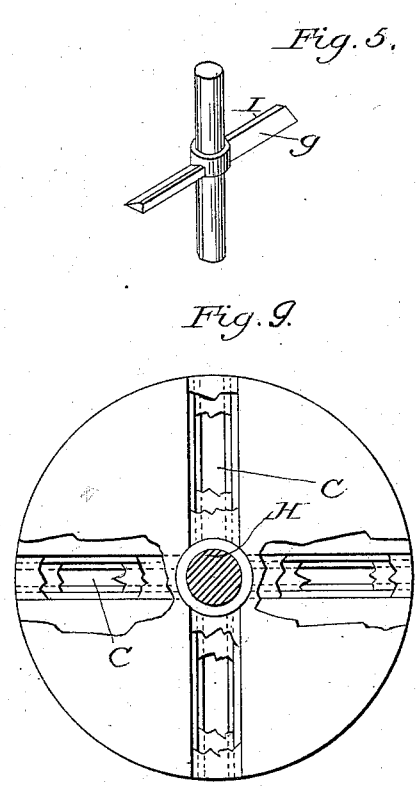
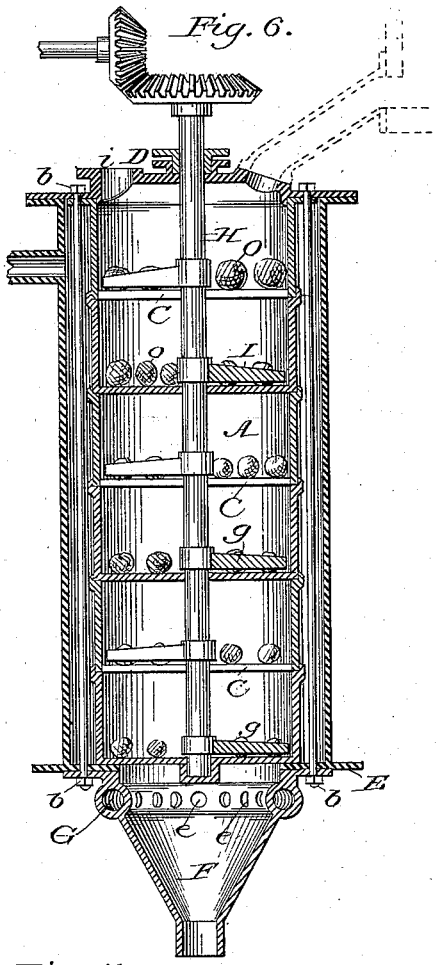
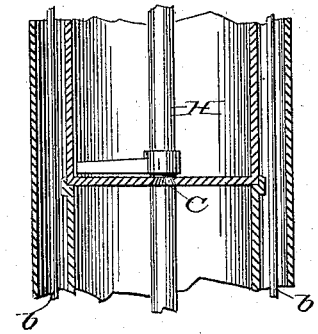
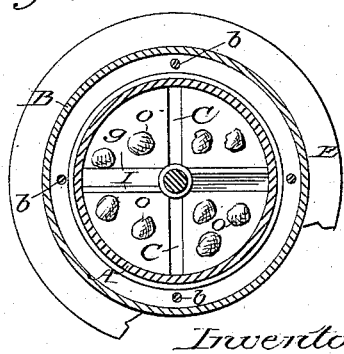
Witnesses:
John K. Rupertus.
John Jolley
Inventor:
Thomas S. Harrison
By his Attorneys,
W. C. Strawbridge
J. Bonsall Taylor

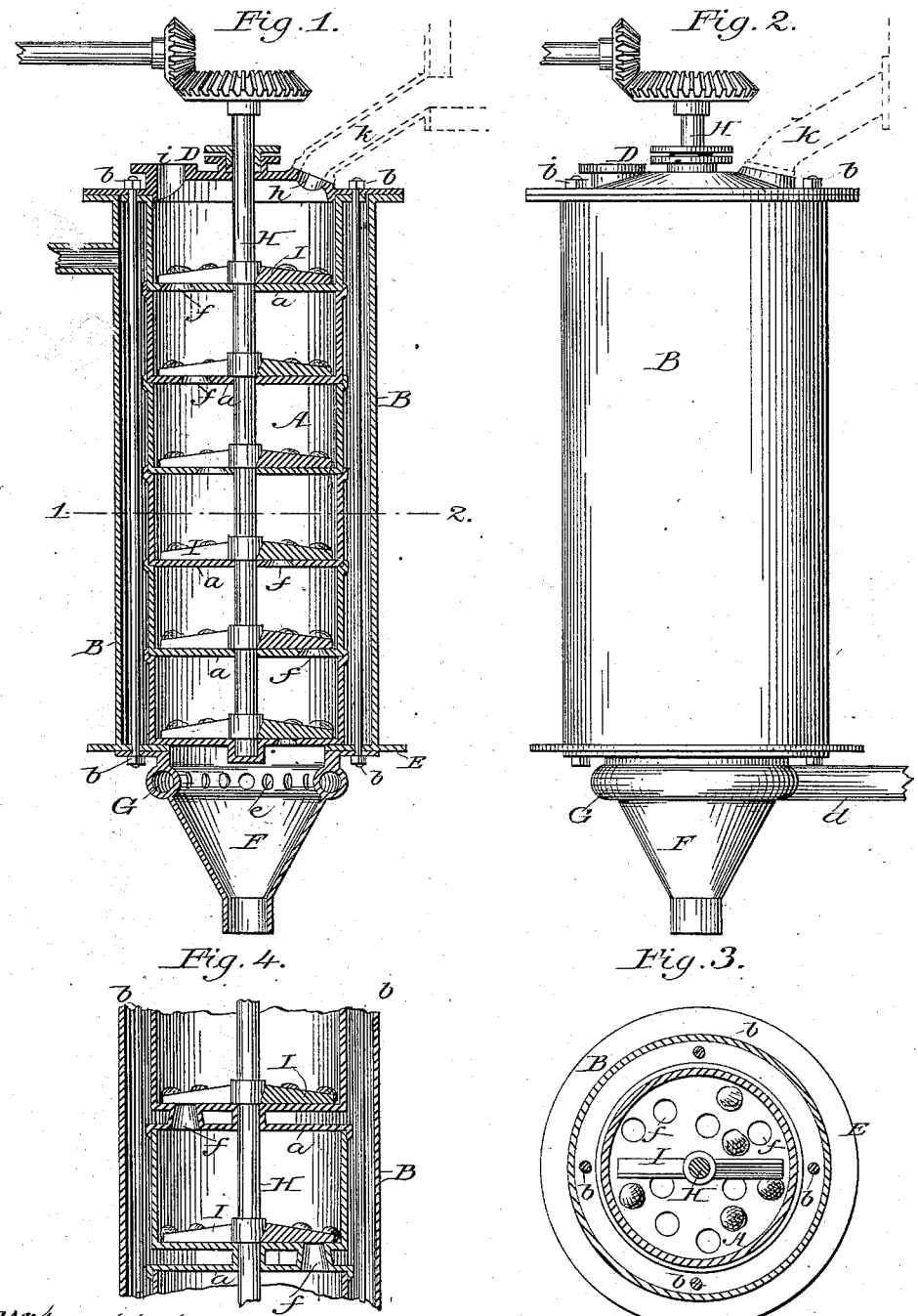

UNITED STATES PATENT OFFICE.

THOMAS S. HARRISON, OF PHILADELPHIA, PENNSYLVANIA.

DRYING APPARATUS.

SPECIFICATION forming part of Letters Patent No. 241,653, dated May 17, 1881.

Application filed January 15, 1881. (No model.)

*To all whom it may concern:*

Be it known that I, THOMAS S. HARRISON, of Philadelphia, Pennsylvania, have invented an Improved Drying Apparatus, of which the following is a specification.

This invention is an improvement upon the drying apparatus invented by me and patented to me in and by Letters Patent No. 101,458, dated April 5, 1870.

My former invention consisted of a hollow casing containing a series of perforated partitions, through which a current of dry or heated air was directed to meet the material to be dried as the latter was caused to fall from partition to partition by the action of a number of arms or scrapers driven by a central rotating shaft, the arms scraping or sweeping the material through the perforations in the partitions.

The operation of the above apparatus, although continuous, is necessarily tedious, for the reason that material when introduced into the apparatus in a wet or pasty condition tends to adhere to the arms and, to a certain extent, clog the apparatus.

My present invention consists in constructing the arms of the apparatus with an angular or oblique scraping or sweeping face, and in providing the partitions with pieces, blocks, or balls of agate, rock, stone, metal, or other hard substance, which by the shape and rotation of the arms are caused to pass or flow over said arms and to fall to their rear, thereby agitating, pounding, and disintegrating the material, and freeing and disengaging it when adhering to the arms.

My invention also consists in graduating the apparatus—that is to say, in making the arms, openings in the partitions, and "pounders," as I term the blocks or pieces, to diminish proportionately in size from the top to the bottom of the apparatus, so as to graduate the operation.

In the accompanying drawings, Figure 1 represents, in central section, a drier conveniently embodying my improvements. Fig. 2 is a side elevation of the same. Fig. 3 is a sectional plan of the platform of Fig. 1; Fig. 4, a partial central section of a platform made hollow or double, so to speak, in order to admit within in it steam to heat it; Fig. 5, a perspective detail of my improved arms; Fig. 6, a central sectional elevation of a form of my apparatus embodying a graduated construction; Fig. 7, a sectional plan of the platform of Fig. 6; Fig. 8, a side-sectional view of the same; and Fig. 9 is a top plan, in magnified detail, of the graduated construction of apparatus represented in Fig. 6.

In the accompanying drawings, A is an inner cylinder or casing, composed in the present instance of a number of sections placed one above the other and fixed together in the manner clearly indicated in the drawings. Each section has a base, $a$, and the several bases form platforms or partitions which separate the interior of the cylinder into compartments which communicate with each other through holes or slots, referred to hereinafter.

An outer cylinder or casing, B, in the present instance, surrounds and is arranged concentrically with the inner cylinder, A, an annular space intervening between the two, for a purpose explained hereinafter.

A cover-plate, D, is fitted to the top, and a base-plate, E, to the bottom, of both cylinders, and on the under side of the latter plate is fitted the inverted cone-shaped spout F.

The inner and outer cylinder, cover-plate, base-plate, and spout may be economically secured together by bolts $b$ passing through the annular space between the cylinders, as shown in Figs. 1 and 3.

An annular chamber, G, communicating with a pipe, $d$, is formed in the spout F, near the upper part of the same, and this chamber communicates with the interior of the spout through a number of perforations, $e$.

A center shaft, H, has its lower bearing in the bottom of the inner cylinder, and passes vertically upward through the several partitions and through a stuffing-box in the cover-plate D. On this shaft are my improved arms, above and in close proximity to each partition, but not in contact therewith, the arms turning with the shaft, the latter being driven by any suitable system of gearing.

To the extent of the parts above described my present apparatus embodies the construction of my former invention.

I represents my improved sweeping-arms, which, instead of being constructed as in my former invention, are made more flat and have an inclined front or face, g. They may be made of the form shown in perspective in Fig. 5.

In the form of apparatus represented in Figs. 1, 3 and 4 there are a number of holes, f, in each partition, which I prefer to arrange in the manner illustrated in Fig. 3, but which may be otherwise disposed, if desired. Through these holes the material to be dried is swept from partition to partition. These holes are reamed out from below, so as to be of a greater diameter at the under face of the partition than at the upper face, by which construction the material is caused to fall entirely through them without adhering, as sometimes happened in the use of my former invention.

In Figs. 6, 7 and 8 I have represented, in place of holes, long openings in the partitions, or radially-arranged slots c, which are also provided with flaring sides, so as to be of greater breadth on their under side than at their upper, for the prevention of the adhering of the material.

It is essential to the best operation of my invention that both the slots and the hole-openings before referred to should be so arranged with respect to their several partitions that no opening or slot comes in line above with an opening or slot in the next lower partition.

O represents the pounders which I employ upon the several partitions, and the action of which is to flow or tumble over the arms as the latter are revolved against them, so as to cause the breaking up, pounding, and disintegration of any conglomerate mass of material under process of drying. The substance of which these powders may be composed will vary according to the material to be dried. In the drying, for instance, of white lead, I prefer that the pounders be of agate or other stone having no chemical action upon the lead, while in drying many other materials the pounders may be formed of metal or other hard substance.

In Fig. 6 is represented a graduated construction of my apparatus, in which the sweeping-arms, pounders, and escape slots or holes in the partitions are of gradually-lessening size from the top to the bottom of the cylinder. By this graduated arrangement I am enabled to obtain very good results in drying, the material being proportionately disintegrated as it travels downward from partition to partition.

In my present apparatus I prefer to employ heated air or the like, as in my former one, to meet the material as it falls from partition to partition.

It will be seen that the drying is effected by stirring, agitating, and disintegrating the material as it reaches each partition, and by causing the material in falling in subdivided streams to meet an upward volume of heated air.

I do not desire to limit myself to any specific form of sweeping-arm, provided, however, that it has an angular front or face, nor to any specific size or character of pounder, provided the latter be of such size as will tumble or pass over the arms, and stir, agitate, and disintegrate the material, both in their movement upon the partitions and in their passage over the arms.

It is, of course, to be understood that the pounders are to be of such size upon their respective partitions that they cannot fall through the slots or holes therein.

Having thus described my invention, I claim and desire to secure by Letters Patent of the United States—

1. As an improved drying apparatus, a hollow casing containing a series of perforated partitions provided with any desired number of spherical or other shaped pounders of the character described, in combination with a series of arms adapted to operate upon the pounders, in the manner and for the purpose described.

2. In combination with the partitions of a drying apparatus of the class herein described, the pounders O, consisting each of separate pieces of stone, metal, or other suitable substance of spherical or other suitable shape, placed loosely upon the partitions, substantially as and for the purposes set forth.

3. As an improved drying apparatus, a hollow casing containing a series of partitions perforated as set forth, and provided with a shaft having sweeping-arms, and with separate pounders upon its partitions, the sweeping-arms, pounders, and perforations in the platforms being of gradually-lessening size from the top to the bottom of the casing, substantially as described.

In testimony whereof I have hereunto signed my name this 21st day of December, 1880.

THOMAS S. HARRISON.

In presence of—
W. C. STRAWBRIDGE,
J. BONSALL TAYLOR.